United States Patent
Uhler et al.

(10) Patent No.: US 7,823,711 B2
(45) Date of Patent: Nov. 2, 2010

(54) DUAL CLUTCH PACK DUAL OPERATING CLUTCH AND METHOD FOR ADJUSTING SAME

(75) Inventors: Adam Uhler, Sterling, OH (US); Philip George, Wooster, OH (US); Todd Sturgin, Shreve, OH (US); Jeffrey Hemphill, Copley, OH (US); Gabor Izso, Buehlertal (DE); Patrick Lindemann, Wooster, OH (US)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 695 days.

(21) Appl. No.: 11/706,663

(22) Filed: Feb. 15, 2007

(65) Prior Publication Data

US 2007/0193843 A1 Aug. 23, 2007

Related U.S. Application Data

(60) Provisional application No. 60/775,619, filed on Feb. 22, 2006, provisional application No. 60/775,622, filed on Feb. 22, 2006, provisional application No. 60/775,623, filed on Feb. 22, 2006, provisional application No. 60/775,621, filed on Feb. 22, 2006, provisional application No. 60/775,620, filed on Feb. 22, 2006.

(51) Int. Cl.
*F16D 21/06* (2006.01)
*F16D 13/75* (2006.01)

(52) U.S. Cl. .................. 192/48.8; 29/469; 192/48.619; 192/110 R; 192/110 B

(58) Field of Classification Search .................. None
See application file for complete search history.

(56) References Cited

U.S. PATENT DOCUMENTS

| | | | |
|---|---|---|---|
| 2,976,569 A | 6/1959 | Quere et al. | |
| 3,009,553 A | 11/1961 | Henyon | 192/48 |
| 3,291,272 A | 12/1966 | Fawick | 192/84 |
| 3,680,669 A * | 8/1972 | Hansen | 192/48.91 |
| 4,111,291 A | 9/1978 | Horstman | 192/105 C |
| 5,875,536 A | 3/1999 | Ring | 29/407.1 |
| 6,196,078 B1 | 3/2001 | DeJonge et al. | 74/473.12 |
| 6,497,158 B1 | 12/2002 | Daly et al. | 73/866.5 |
| 6,499,579 B2 * | 12/2002 | Ono et al. | 192/113.36 |
| 6,533,705 B1 | 3/2003 | Giefer et al. | 477/96 |
| 6,588,294 B1 | 7/2003 | Rogg | 74/473.21 |
| 6,708,807 B1 | 3/2004 | Martin | 192/70.19 |

(Continued)

FOREIGN PATENT DOCUMENTS

DE 2608348 9/1976

(Continued)

*Primary Examiner*—Rodney H Bonck
(74) *Attorney, Agent, or Firm*—Simpson & Simpson, PLLC

(57) ABSTRACT

A dual automatic mechanically actuated wet clutch device, for operation within a fluid tight housing, for a dual input shaft transmission that includes tightly specified average spacing between friction plate surfaces where the average spacing is selected from between about 0.05 mm to about 0.25 mm in an open position. The clutch has at least first and second independently actuatable clutch portions, and at least one clutch pack in the first or second clutch portion; and mechanical apparatus provided to move friction plates in at least one of the clutch portions toward each other so that they engage. The invention also includes apparatus and methods for adjusting and maintaining the spacing between the friction plate surfaces.

35 Claims, 9 Drawing Sheets

U.S. PATENT DOCUMENTS

| | | | |
|---|---|---|---|
| 6,819,997 B2 | 11/2004 | Buchanan et al. | 701/67 |
| 6,976,569 B2 | 12/2005 | Khaykin et al. | 192/220.4 |
| 2004/0035668 A1* | 2/2004 | Prater | 29/434 |
| 2005/0139442 A1 | 6/2005 | Agner et al. | 192/48.8 |

FOREIGN PATENT DOCUMENTS

| | | |
|---|---|---|
| DE | 4343112 | 6/1995 |
| DE | 4408666 | 9/1995 |
| DE | 10338558 | 3/2004 |
| DE | 10334867 | 2/2005 |
| DE | 102005027610 | 12/2005 |
| EP | 0812998 | 8/2001 |
| EP | 1422430 | 5/2004 |
| EP | 1610021 | 12/2005 |

* cited by examiner

DUAL CLUTCH PACK DUAL OPERATING CLUTCH AND METHOD FOR ADJUSTING SAME

This application claims the benefit under 35 U.S.C. §119 (e) of the following U.S. Provisional Applications, all filed on Feb. 22, 2006: U.S. Provisional Application No. 60/775,619; U.S. Provisional Application No. 60/775,622; U.S. Provisional Application No. 60/775,623; U.S. Provisional Application No. 60/775,621; and U.S. Provisional Application No. 60/775,620.

BACKGROUND OF THE INVENTION

This invention relates to clutches and clutch systems for transferring torque from an engine to a transmission system and more particularly relates to a clutch system for use in vehicles, e.g. in automobiles and trucks.

Most such systems are single clutch systems, i.e. a single clutch is either engaged or disengaged to cause transfer of essentially all torque from an engine to drive wheels when the clutch is closed or none of it when the clutch is open. Such systems have had serious disadvantages since the engine becomes entirely disengaged from the drive wheels when shifting occurs within a transmission between the clutch and the drive wheels. Completely smooth transition between various transmission gears is thus not possible.

Transmissions are known having dual input shafts from the engine and it has been known that automatic dual clutch systems could be used to transfer torque from an engine through such a transmission to drive wheels while permitting shifting of gears for varying torque transfer without complete engine disengagement. Such an automatic system is, for example described in U.S. Pat. No. 6,819,997, incorporated herein by reference. Such known systems, nevertheless have had serious disadvantages.

Although mechanical actuators are mentioned, U.S. Pat. No. 6,819,997 primarily relies upon hydraulically operated actuators. No structure or suggestion of how mechanical actuators might be made to function is disclosed or suggested in U.S. Pat. No. 6,819,997. Furthermore, this patent discloses nothing as to how adverse effects of wear and overheating, due to friction between clutch surfaces during torque transfer changes, might be reduced. There is certainly no disclosure or suggestion as to how spacing between friction surfaces might be controlled or maintained.

Commonly assigned U.S. Patent publication US 2005/0139442, filed Dec. 23, 2004 and published Jun. 30, 2005, incorporated herein by reference, describes a dual clutch transmission system having two transmission input shafts and one transmission output shaft where each transmission input shaft is connectable to an internal combustion engine via a clutch of a torque transmission device. Friction clutches are described. A problem with the systems described in this patent publication is that there is no disclosure or suggestion of desired clutch friction plate spacings and certainly no discussion or suggestion of how to avoid significant variability between friction plate spacing yielding clutch packs that are either too tight causing significant wear and heat at friction surfaces or are too loose causing slippage and/or requiring significant mechanical travel before engagement can occur. Extreme variability within such dual clutch apparatus and between such different apparatus can thus be common, making fitting into assembly line operation extremely difficult and frequently unacceptable and causing undesirable variability between resulting products.

BRIEF DESCRIPTION OF THE INVENTION

In accordance with the present invention a dual automatic mechanically actuated wet clutch device is provided for a dual input shaft transmission that includes tightly specified spacings or gaps between friction plate surfaces and control mechanisms for controlling such spacing during operation. The dual clutch system functions well for smoothly transferring torque from an engine through a dual input shaft transmission to drive wheels. The tightly specified friction surface spacing and apparatus and method for obtaining and maintaining it permit consistent clutch operation with respect to mechanical travel and engagement pressure. The wet clutch surfaces reduce wear and degradation due to friction.

More particularly the invention includes a clutch having at least first and second independently actuatable clutch portions at least one of which is for operation in a normally fluid tight housing containing fluid (usually a transmission housing) and at least one clutch pack in the first or second clutch portion, and mechanical apparatus provided to move friction plates in at least one of the clutch portions toward each other so that they engage.

The first clutch portion includes a first clutch portion clutch pack having:

i) a first clutch pack first series of coaxial friction plates engaged with a first drive ring and being axially movable in relation thereto, where the first drive ring is directly or indirectly connectable to the drive shaft of an engine; and ii) a first clutch pack second series of coaxial friction plates engaged with a first driven ring and being axially movable in relation thereto, where the driven ring is directly or indirectly connectable to a transmission, usually through a first input shaft to the transmission.

The friction plates of the second series of friction plates are in alternating relationship and coaxial with the friction plates of the first series of friction plates to form a friction plate set.

The friction plates of the first series are normally in a spaced relationship with the friction plates of the second series such that there is an average gap of from about 0.05 to about 0.25 mm between adjacent friction plates in an open position. Variance between gaps is usually less than 0.1 mm and preferably less than 0.05 mm.

The friction plates are movable toward each other along their respective drive and driven rings so as to engage each other on friction surfaces of the friction plates in a closed position so as to enable the transfer of torque from the drive ring to the driven ring without significant slippage between adjacent friction plates. The amount of such movement or travel from the open position to the closed position (friction plates touching) is the number of gaps between friction plates times the average gap. To obtain complete engagement a small amount of additional travel, e.g. 0.1 mm, may occur so that the friction plates are engaged under pressure.

Usually first and second clutch portions are provided that have radially concentric first and second clutch packs respectively. In such a case one of the first and second clutch packs is usually an outer clutch pack having a larger inside diameter than an outside diameter of the other of the first and second clutch packs which is an inner clutch pack.

The second clutch pack usually includes:

i) a second clutch pack first series of coaxial friction plates engaged with a second drive ring and being axially movable in relation thereto. The second drive ring is directly or indirectly connected to the drive shaft of an engine; and ii) a second clutch pack second series of coaxial friction plates engaged with a second driven ring and being axially movable in relation thereto. The second driven ring is directly or indirectly connected to a transmission, usually through a second input shaft to the transmission.

The friction plates of the second clutch pack second series of friction plates are in alternating relationship and coaxial with the friction plates of the second clutch pack first series of friction plates to form a friction plate set. The friction plates of the second clutch pack first series being normally in a spaced relationship with the friction plates of the second clutch pack second series such that there is an average gap of from less than about 0.05 to less than about 0.25 mm between adjacent friction plates in an open position. Again, variance between gaps is usually less than 0.1 mm and preferably less than 0.05 mm.

The friction plates of the second clutch pack are movable toward each other along their respective drive and driven rings so as to engage each other on their surfaces so as to enable the transfer of torque from the second drive ring to the second driven ring without significant slippage between adjacent friction plates.

The invention also includes a method for adjusting a clutch, as above described, wherein the first clutch portion is an outer clutch portion having an outer fulcrum that reacts against an outer lever spring and the outer fulcrum directly or indirectly transmits applied force to the outer clutch pack to engage the outer clutch pack friction surfaces, as a result of pressure applied to the fulcrum by the outer lever spring;

wherein the second clutch portion is an inner clutch portion having an inner fulcrum that reacts against an inner lever spring and the inner fulcrum directly or indirectly transmits applied force to the inner clutch pack to engage the inner clutch pack friction surfaces, as a result of pressure applied to the inner fulcrum by the inner lever spring; and wherein the clutch is provided with a main clutch bearing permitting clutch rotation.

The method includes the steps of:

adjusting tolerance from the main clutch bearing to a touch point between the outer fulcrum and the outer lever spring to permit a normally open spacing between friction surfaces of between 0.05 and 0.25 mm, preferably at a variance between spacings at least as good as ±0.1 mm and more preferably as good as ±0.05 mm, and to permit sufficient pressure on the friction surfaces during engagement to prevent significant slippage during torque transfer; and adjusting tolerance from the main clutch bearing to an inner touch point between the inner fulcrum and the inner lever spring to permit a normally open spacing between inner friction surfaces of between 0.05 and 0.25 mm, preferably at a variance between spacings at least as good as ±0.1 mm and more preferably at least as good as ±0.05 mm and to permit sufficient pressure on the friction surfaces during engagement to prevent significant slippage during torque transfer.

DETAILED DESCRIPTION OF THE INVENTION

Figure 1:
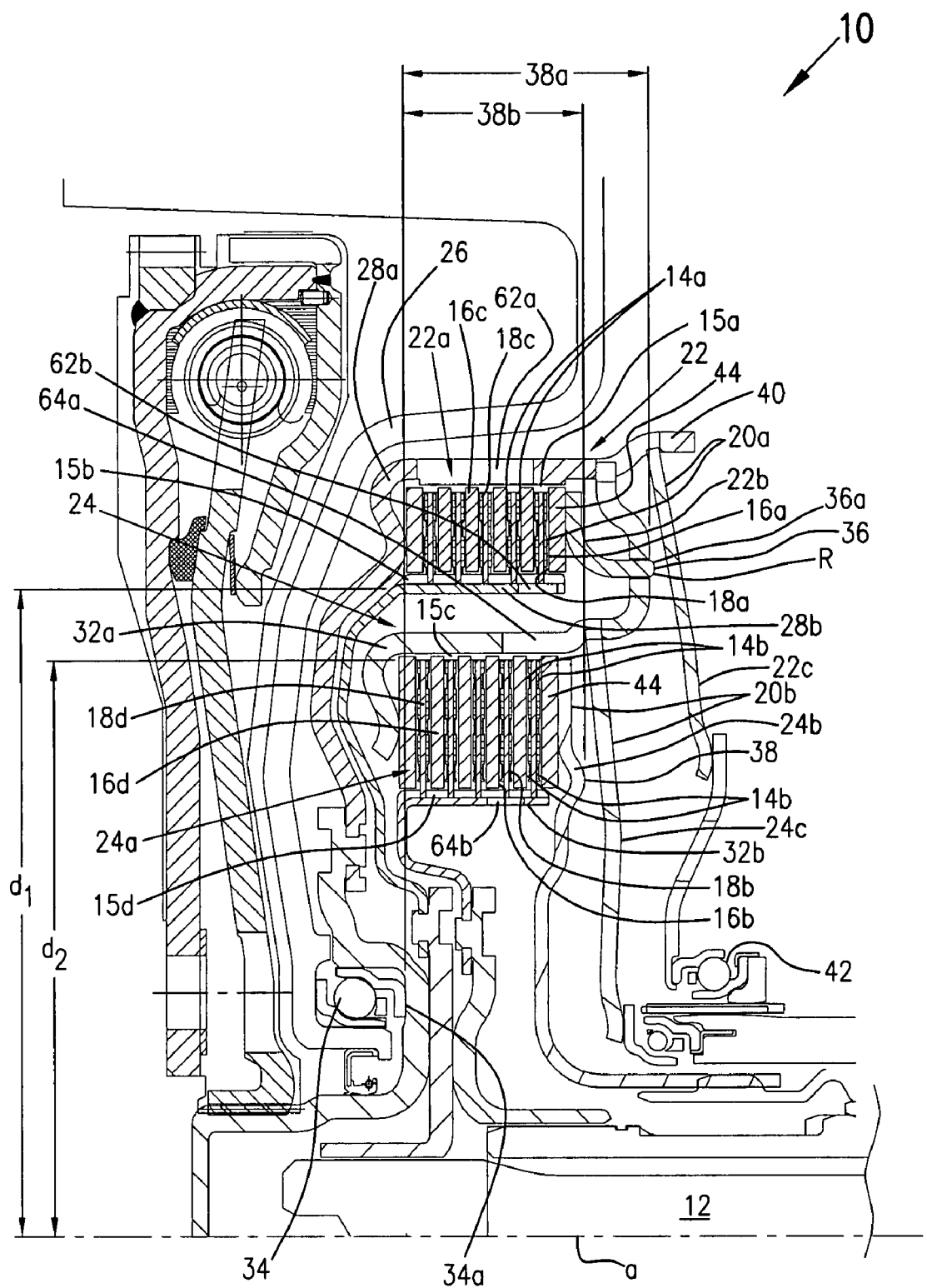
FIG. 1 is an upper half cross sectional side view of a first preferred embodiment of a dual output clutch in accordance with the invention.

As previously discussed, the present invention includes a dual automatic mechanically actuated wet clutch device for a dual input shaft transmission that includes tightly specified spacing between friction plate surfaces. The dual clutch system functions well for smoothly transferring torque from an engine through a dual input shaft transmission to drive wheels. The tightly specified friction surface spacing and apparatus and method for obtaining and maintaining it permit consistent clutch operation with respect to mechanical travel and engagement pressure. The wet clutch surfaces reduce wear and degradation due to friction. Further, and unexpectedly, it has been found that fluid in the wet clutch can be used for maintaining a relatively uniform gap distance between the surfaces by means of causing the fluid to flow between the gaps using centrifugal force generated by rotation of the clutch when force is sufficiently reduced so that the surfaces are not held together.

In general, the dual input shaft transmission, for use in conjunction with the dual or twin clutch of the invention, may be any dual input shaft transmission, e.g. as described in U.S. Pat. No. 6,819,997, incorporated herein by reference as background art. Details of an example of such a transmission are, for example, described in detail in the discussion in U.S. Pat. No. 6,819,997 with respect to FIG. 1 of that patent. The transmission has dual coaxial input shafts, each of which is engageable with an output shaft of an engine using a prior art dual clutch. The dual clutch, as described in U.S. Pat. No. 6,819,997 has disadvantages of wear and other problems associated with slippage and lack of means or for close tolerance adjustment or maintenance, further complicated by serial alignment of the dual clutches. Another example of a dual input shaft transmission clutch is described in co-assigned U.S. Patent Publication US 2005/0139442 A1, incorporated herein by reference. The dual clutch arrangement in this Patent Publication is somewhat similar to that of the present invention. There is, however, no suggestion of close tolerance adjustment and no means or method for close tolerance adjustment is disclosed or suggested.

The dual clutch of the present invention has at least first and second normally open independently actuatable clutch portions. One of the clutch portions operates between the engine and a first input shaft to the transmission and the second portion operates between the engine and a second input shaft to the transmission. Usually, only one, or none of the clutch portions may be engaged, but both may be momentarily engaged during transition from a gear driven by one of the input shafts to a gear driven by the other of the input shafts. In such a case, until one of the clutch portions is disengaged, one or both of the clutch portions may slip resulting in a smooth gear transition.

As previously discussed, at least the first clutch portion has a first clutch portion clutch pack including:

i) a first clutch pack first series of coaxial friction plates engaged with a first drive ring and being axially movable in relation thereto, and the first drive ring is directly or indirectly connected to the drive shaft of an engine; and ii) a first clutch pack second series of coaxial friction plates engaged with a first driven ring and being axially movable in relation thereto, and the first driven ring that is directly or indirectly connectable to a first input shaft to a transmission.

The friction plates in the first clutch pack are movable toward each other along their respective drive and driven rings so as to engage each other on friction surfaces of the friction plates so as to enable the transfer of torque from the drive ring to the driven ring.

The friction plates of the first clutch pack second series of friction plates are in alternating relationship and coaxial with the friction plates of the first clutch pack first series of friction plates to form a friction plate set, the friction plates of the first series being normally in a spaced relationship with the friction plates of the second series such that there is an average gap between plates of from about 0.05 to about 0.25 mm between adjacent friction plates.

The second clutch portion may include a wet or dry second clutch pack or may be hydraulic but preferably includes a wet second clutch pack similar to the first portion wet clutch pack. In this case, the clutch pack of the first clutch portion and the clutch pack of the second clutch portions are preferably radially concentric first and second clutch packs respectively. One of the first and second clutch packs is preferably an outer clutch pack having a larger inside diameter than an outside diameter of the other of said first and second clutch packs being an inner clutch pack.

Preferably the second clutch pack includes:

i) a second clutch pack first series of coaxial friction plates engaged with a second drive ring and being axially movable in relation thereto, where the second drive ring is directly or indirectly connectable to the drive shaft of the engine; and ii) a second clutch pack second series of coaxial friction plates engaged with a second driven ring and being axially movable in relation thereto, where the second driven ring is directly or indirectly connectable to a second input shaft to the transmission.

The friction plates of the second clutch pack are movable toward each other along their respective drive and driven rings so as to engage each other on their surfaces so as to enable the transfer of torque from the second drive ring to the second driven ring without significant slippage between adjacent friction plates.

As in the case of the first clutch pack, the friction plates of the second clutch pack second series of friction plates are in alternating relationship and coaxial with the friction plates of the second clutch pack first series of friction plates to form a second clutch pack friction plate set. The friction plates of the second clutch pack first series are normally open in a spaced relationship with the friction plates of the second clutch pack second series such that there is an average gap of from about 0.05 to about 0.25 mm between adjacent friction plates, Apparatus is provided to move the friction plates within the clutch packs toward each other. The moving apparatus of the first clutch portion is entirely mechanical. The second moving apparatus may include hydraulics or be entirely mechanical as with the first clutch portion.

The first portion clutch pack is for operation within a normally fluid tight housing containing fluid, and preferably the second portion clutch pack is also for operation within a normally fluid tight housing containing fluid. The first portion clutch pack and second portion clutch pack are preferably for operation within the same fluid tight housing, e.g. the transmission housing.

The gap between plates in both the first and second clutch packs of the first and second clutch portions are preferably held to a variance at least as good as ±0.1 mm and more preferably to a variance at least as good as ±0.05 mm.

Movement or travel from the fully open position to the closed position where friction plates are in contact, is the number of gaps between friction plates times the average gap and, as previously discussed, slight additional movement, e.g. 0.1 mm, may occur as the friction plates are placed under pressure by further movement of a throw out bearing interconnected to a lever spring that applies pressure to a fulcrum moving the friction plates toward each other.

The friction plates are usually disks made of a structural shape retaining material, usually a high performance metal such as steel, stainless steel or aluminum that have friction surfaces that may be provided with a hard abrasion, shock and heat resistant surface material such as a ceramic fiber reinforced metal or ceramic matrix.

The hard abrasion, shock and heat resistant surface material may be found on all friction surfaces of the friction plates but is commonly, and even preferably found only on the friction surfaces of alternate plates. In such a case the hard abrasion, shock and heat resistant surface material is usually found on both opposing friction surfaces of such alternate plates. Preferably, the first clutch pack, and when present, the second clutch pack, includes from about 3 to about 8 friction plates, 2 of which are exterior friction plates having a single inwardly facing friction surface and the balance of which are interior friction plates having dual friction surfaces on opposite sides.

As previously discussed, the friction plates in the first clutch pack are movable toward each other along their respective drive and driven rings so as to engage each other on friction surfaces of the friction plates so as to enable the transfer of torque from the drive ring to the driven ring without significant slippage between adjacent friction plates at least partly because there is only momentary engagement of both clutch portions during which transition slippage can occur. Additionally, due to rapid lock up of friction surfaces of the active clutch portion, inertial slippage is minimized. "Without significant slippage" means that slippage is insufficient to create destructive heat and without excessive wear at friction surfaces. "Without excessive wear" means that the friction surfaces will last at least about 25,000 miles (40,000 km) and preferably at least about 50,000 miles (80,000 km) during normal operation of the vehicle.

As previously discussed a first mechanical apparatus is provided to move the first clutch portion friction plates toward each other along their respective drive and driven rings so as to engage each other on friction surfaces of the friction plates enabling the transfer of torque from the drive ring to the driven ring and similarly a second mechanical apparatus may be provided to move second clutch portion friction plates toward each other along their respective drive and driven rings so as to engage each other on friction surfaces of the friction plates enabling the transfer of torque from the drive ring to the driven ring. It nevertheless should be understood that while the first mechanical apparatus is preferably entirely mechanical, the second apparatus may include hydraulics.

In a preferred embodiment, the mechanical apparatus includes at least one disk shaped lever that, when activated, provides pressure against a disk shaped outer friction plate of the clutch pack to move the friction plates so as to engage each other on the friction surfaces enabling the transfer of torque from the drive ring to the driven ring and when deactivated permit return of the friction plates to their normally spaced relationship, usually at least partly as a result of liquid pressure applied through gaps between plates as a result of centrifugal force. When pressure is applied to the disk shaped levers, usually near an inner circumference of the ring, the disk is forced toward an activating fulcrum that in turn pushes the friction plates toward each other. When the disk shaped lever is initially moved, it is not in contact with a fulcrum, thus the entire lever moves until near its edge it hits a support point, e.g. on a drive ring that may be or may form a portion of a clutch support housing. Continued pressure forces the lever against a fulcrum that tries to move the friction plates thus causing the lever to bend about the fulcrum. An edge of the lever thus bends away from the support point toward a pivot point that is also usually on a portion of a support housing including the drive ring.

The first mechanical apparatus and second apparatus can operate independently of each other so as to engage and disengage the friction plates of the first and second clutch packs independently of each other.

Sufficient pressure is generally applied by the mechanical apparatus to engage friction plate friction surfaces to permit no more slippage between engaged friction surfaces than is required to dampen engine vibration or to assist in providing a gradual rotational speed transition from the engine to the transmission.

In a preferred embodiment, the first clutch portion is an outer clutch portion and the first clutch portion has an outer fulcrum, that is also preferably disk shaped, that reacts against an outer lever spring. In this preferred embodiment, the outer fulcrum directly or indirectly transmits applied force to the outer clutch pack to engage the outer clutch pack friction surfaces, as a result of pressure applied to the fulcrum by the outer lever spring. Preferably, the clutch is provided with a main clutch bearing permitting clutch rotation and tolerance from the main clutch bearing to a touch point between the outer fulcrum and the outer lever spring is adjusted to permit an average normally open spacing between friction surfaces desirably less than 1 mm, preferably less than 0.5 mm and most preferably between 0.05 and 0.25 mm and to permit sufficient pressure on the friction surfaces during engagement to prevent significant slippage during torque transfer. The average normally open spacing preferably is maintained at a variance of less than ±0.1 mm and preferably less than ±0.05 mm between spacings.

Additionally in a preferred embodiment, the second clutch portion is an inner clutch portion that has an inner fulcrum that reacts against an inner lever spring. In this embodiment, the inner fulcrum directly or indirectly transmits applied force to the inner clutch pack to engage the inner clutch pack friction surfaces, as a result of pressure applied to the inner fulcrum by the inner lever spring. Again the clutch is provided with the main clutch bearing permitting clutch rotation and tolerance from the main clutch bearing to an inner touch point between the inner fulcrum and the inner lever spring is adjusted to permit a normally open spacing between inner friction surfaces of between 0.05 and 0.25 mm and to permit sufficient pressure on the friction surfaces during engagement to prevent significant slippage during torque transfer. Again the average normally open spacing preferably is maintained at a variance of less than ±0.1 mm and preferably less than ±0.05 mm.

In one embodiment, the adjustment is accomplished by machining a pivot force receiving end of the fulcrum to produce a desired distance from the bearing to the touch point.

In another embodiment a radius approximating half the thickness of the fulcrum is machined at an end of the fulcrum at the touch point to maintain a more consistent lever ratio.

In yet a further embodiment an outer pusher is provided between the outer fulcrum and the outer clutch pack such that the outer fulcrum reacts against the outer lever spring and transmits applied force through the outer pusher to the outer clutch pack to engage the outer clutch pack friction surfaces and tolerance between the main clutch bearing and the outer touch point is adjusted using shims between the clutch plates and the outer pusher. In this embodiment the outer pusher preferably incorporates an oil dam that prevents cooling oil flow from by-passing the outer clutch pack. A similar arrangement may be used in conjunction with the inner clutch pack.

In yet a further embodiment tolerance from the main clutch bearing to the outer touch point between the outer fulcrum and the outer lever spring is adjusted by machining or shimming a push portion of the outer fulcrum or by machining or shimming at an outer pivot portion of the outer fulcrum.

In still a further embodiment, the outer fulcrum is bent at an inner diameter to increase fulcrum stiffness and to form a surface containing the touch point.

In yet a further embodiment, the outer fulcrum is bent to form a surface at a push portion to distribute force over a larger surface area of the outer clutch pack.

An outer friction plate of the outer clutch pack may be shimmed or machined to adjust the outer touch point An outer lever spring preload can be adjusted by machining an outer support housing support point of the clutch where the outer lever spring is in contact.

Outer lever spring preload may also be adjusted by shims between the outer support housing of the clutch and the outer support point of the outer lever spring.

It should also be pointed out that in a most preferred embodiment of the invention a dual clutch is provided having a preload, i.e. an initial, always present force holding mechanical actuating components in place. In accordance with the preferred embodiment, the preload is adjusted to obtain consistency in actuation and to avoid chatter, looseness or disengagement of mechanical actuators utilized in the invention. It is understood that the actuating components referred to is the mechanical apparatus that, when activated moves clutch friction plates toward each other, usually for purposes of engagement and that when deactivated permits their release.

In one preferred embodiment, the clutch support housing comprises an outer plate (usually including the drive ring) and an outer carrier and the outer lever spring is assembled to the outer carrier and outer lever spring distance from the clutch bearing is adjusted by connecting the outer carrier to the outer plate based on an outer lever spring preload.

In yet a further preferred embodiment the inner clutch portion has an inner fulcrum that reacts against an inner lever spring and the inner fulcrum directly or indirectly transmits applied force to the inner clutch pack to engage the inner clutch pack friction surfaces, as a result of pressure applied to the inner fulcrum by the inner lever spring and tolerance from the main clutch bearing to an inner touch point between the inner fulcrum and the inner lever spring is adjusted to permit an average normally open spacing between inner friction surfaces of between 0.05 and 0.25 mm with a variance of less than about 0.1 mm and preferably less than about 0.05 mm between spacings and to permit sufficient pressure on the inner friction surfaces during engagement to prevent significant slippage during torque transfer.

In another embodiment, the main clutch bearing to the inner touch point between the inner fulcrum and the inner lever spring is adjusted by machining or shimming a push portion of the inner fulcrum or by machining a pivot portion of the inner fulcrum.

An outer friction plate of the inner clutch pack may be shimmed to adjust the inner touch point and a flange from an inner clutch drive ring/inner support housing may be machined to adjust distance from the main bearing to the inner touch point.

The outer clutch support housing may be divided into an outer plate and an outer carrier where the outer spring lever is assembled to the outer carrier, is supported by and pivots thereon. The outer touch point may be corrected as previously described and outer spring preload may be adjusted by adjusting spring height (pivot point distance from the main bearing). This may be accomplished by axially moving the outer carrier relative to the outer plate to adjust spring height before securing, e.g. welding, the outer carrier to the outer plate.

Height from the inner spring pivot point to the main bearing can be further adjusted by a separate machining or stamping process.

Preload of the outer spring may also be adjusted by machining a stop flange on the support housing reducing height from the main bearing and permitting the spring to be less biased and preload on the inner spring can be adjusted by adjusting position of an inner support housing comprising the inner drive ring and containing the inner spring pivot point and support point by positioning it relative to the flange and securing it thereto, e.g. by a communicating welded connector or flange.

The method of the invention is for adjusting a dual clutch pack dual output clutch, as previously discussed.

The method includes the steps of:

adjusting tolerance from the main clutch bearing to a touch point between the outer fulcrum and the outer lever spring to permit a normally open spacing between friction surfaces of between 0.05 and 0.25 mm and to permit sufficient pressure on the friction surfaces during engagement to prevent significant slippage during torque transfer; and adjusting tolerance from the main clutch bearing to an inner touch point between the inner fulcrum and the inner lever spring to permit a normally open spacing between inner friction surfaces of between 0.05 and 0.25 mm and to permit sufficient pressure on the friction surfaces during engagement to prevent significant slippage during torque transfer.

The above adjustments are preferably made so that there is a variance of less than about ±0.1 mm and most preferably less than about 0.05 mm between friction surfaces.

Tolerance from the main clutch bearing to the outer touch point between the outer fulcrum and the outer lever spring is preferably adjusted by machining or shimming a push portion of the outer fulcrum or by machining or shimming at the outer pivot portion of the outer fulcrum.

Outer spring preload is adjusted by adjusting tolerance (distance) from the main bearing to the outer spring support point measured on a line parallel to the rotational axis of the outer drive ring. The outer spring pivot point is adjusted by moving the outer carriage relative to the main bearing or by shimming at the pivot point.

Tolerance from the main clutch bearing to the inner touch point between the inner fulcrum and the inner lever spring is preferably adjusted by machining or shimming a push portion of the inner fulcrum or by machining the pivot portion of the inner fulcrum.

Inner spring preload is adjusted by adjusting tolerance (distance) from the main bearing to the inner spring support point measured on a line parallel to the rotational axis of the inner drive ring. The inner spring support point is adjusted by moving the inner housing (inner carriage/inner drive ring) relative to the main bearing or by shimming at the support point.

The invention may be better understood by reference to the drawings illustrating preferred embodiments thereof.

As seen in FIGS. 1-9 all preferred embodiments of the invention have structure in common.

All views of the drawings are for preferred dual clutch embodiments of the invention showing cross sections of an upper half of the embodiments. It should be understood that most elements shown are essentially disk shaped, i.e. in three dimensions would arcuately protrude from the plane of the drawing surface. The clutch embodiments in operation would rotate about an axis "a" at the bottom of the several figures.

In particular, in accordance with the present invention, a preferred dual automatic mechanically actuated wet clutch device 10 is provided for a dual input shaft transmission 12 that includes tightly specified spacings 14a and 14b between surfaces of friction plates 16c, 18c and 16d, 18d and control mechanisms 20a and 20b for controlling such spacings 14a and 14b during operation. The dual clutch system 10 functions well for smoothly transferring torque from an engine through a dual input shaft transmission 12 to drive wheels. The tightly specified friction surface spacings 14a and 14b and apparatus 20a and 20b and method for obtaining and maintaining it permit consistent clutch operation with respect to mechanical travel and engagement pressure. The wet surfaces of friction plates 16c, 16d, 18c and 18d reduce wear and degradation due to friction.

More particularly the invention includes a clutch 10 having at least first and second independently actuatable clutch portions 22 and 24 at least one of which is for operation within a normally fluid tight housing 26 containing fluid and at least one clutch pack 22a, 24a in the first or second clutch portion 22, 24, and mechanical apparatus 20a and 20b provided to move friction plates 16c, 18c and 16d, 18d in at least one of the clutch portions 22, 24 toward each other so that they engage.

The first clutch portion 22 includes a first clutch portion clutch pack 22a having:

i) a first clutch pack first series of coaxial friction plates 16c engaged with a first drive ring 28a and being axially movable in relation thereto on a slide 15a or within a groove between teeth, where the first drive ring 28a is directly or indirectly connectable to a drive shaft of an engine; and ii) a first clutch pack second series 18c of coaxial friction plates engaged with a first driven ring 28b and being axially movable in relation thereto on a slide 15b, where the driven ring 28b is directly or indirectly connectable to a transmission, usually through a first input shaft to the transmission.

The friction plates 18c of the second series of friction plates are in alternating relationship and coaxial with the friction plates of the first series of friction plates 16c to form a friction plate set.

The friction plates of the first series 16c are normally in a spaced relationship with the friction plates of the second series 18c such that there is an average gap 14a of from about 0.05 to about 0.25 mm between adjacent friction plates in an open position.

The friction plates 16c, 18c are movable toward each other along their respective drive and driven rings 28a, 28b so as to engage each other on friction surfaces 16a, 18a of the friction plates in a closed position so as to enable the transfer of torque from the drive ring 28a to the driven ring 28b without significant slippage between adjacent friction plates. The amount of such movement or travel from the open position to the closed position is the number of gaps 14a between friction plates 16c, 18c times the average gap plus a possible minimum additional movement to complete engagement under pressure, e.g. 0.1 mm.

Usually first and second clutch portions 22, 24 are provided that have radially concentric first and second clutch packs 22a and 24a respectively for placement within a fluid tight housing 26. In such a case one of the first and second clutch packs 22a, 24a is usually an outer clutch pack 22a having a larger inside diameter d1 than an outside diameter d2 of the other of the first and second clutch packs 22a and 24a which is an inner clutch pack 24a.

The second clutch pack usually includes:

i) a second clutch pack first series of coaxial friction plates 16d engaged with a second drive ring 32a and being axially movable in relation thereto on a slide 15c and optionally within a groove between teeth. The second drive ring 32a is directly or indirectly connectable to the drive shaft of an engine; and ii) a second clutch pack second series of coaxial friction plates 18d engaged with a second driven ring 32b and being axially movable in relation thereto on a slide 15d. The second driven ring 32b is directly or indirectly connectable to a transmission, usually through a second input shaft to the transmission.

The friction plates of the second clutch pack second series of friction plates 18d are in alternating relationship and coaxial with the friction plates of the second clutch pack first series 16d of friction plates to form a friction plate set. The friction plates of the second clutch pack first series 16d being normally in a spaced relationship with the friction plates of the second clutch pack second series 18d such that there is an average gap 14b of from about 0.05 to about 0.25 mm between adjacent friction plates 16d and 18d in an open position.

The friction plates 16d, 18d of the second clutch pack 24a are movable toward each other along their respective drive and driven rings 32a, 32b so as to engage each other on their surfaces 16b, 18b so as to enable the transfer of torque from the second drive ring 32a to the second driven ring 32b without significant slippage between adjacent friction plates.

The invention also includes a method for adjusting a clutch 10, as above described, wherein the first clutch portion 22 is an outer clutch portion having an outer fulcrum 22b that reacts against an outer lever spring 22c and the outer fulcrum 22b directly or indirectly transmits applied force to the outer clutch pack 22a to engage the outer clutch pack friction surfaces 16a, 18a, as a result of pressure applied to the fulcrum 22b by the outer lever spring 22c;

wherein the second clutch portion 24 is an inner clutch portion having an inner fulcrum 24b that reacts against an inner lever spring 24c and the inner fulcrum 24b directly or indirectly transmits applied force to the inner clutch pack 24a to engage the inner clutch pack friction surfaces 16b, 18b, as a result of pressure applied to the inner fulcrum 24b by the inner lever spring 24c; and wherein the clutch 10 is provided with a main clutch bearing 34 permitting clutch rotation.

The method includes the steps of:

adjusting tolerance 38a from the main clutch bearing 34 to a touch point 36 between the outer fulcrum 22b and the outer lever spring 22c to permit a normally open spacing 14a between friction surfaces of between 0.05 and 0.25 mm, preferably at a variance at least as good as about ±0.1 mm and more preferably at least as good as ±0.05 mm, and to permit sufficient pressure on the friction surfaces 16a, 18a during engagement to prevent significant slippage during torque transfer; and adjusting tolerance 38b from the main clutch bearing 34 to an inner touch point 38 between the inner fulcrum 24b and the inner lever spring 24c to permit a normally open average spacing 14b between inner friction surfaces 16b, 18b of between 0.05 and 0.25 mm, preferably at a variance of at least as good as ±0.1 mm and more preferably at least as good as ±0.05 mm and to permit sufficient pressure on the friction surfaces 16b, 18b during engagement to prevent significant slippage during torque transfer.

E.g., as shown in FIG. 1, the tolerance 38a from the main clutch bearing 34 to the touch point 36 for the outer clutch portion 22 can be adjusted by determining a desired distance from the hub bearing surface 34a of the bearing 34 to the touch point 36 of fulcrum 22b on a line parallel to the rotational axis "a" of the drive ring 28a and then machining the pivot end 36a of the fulcrum 22b to produce the desired distance 38a from the bearing 34 to the touch point 36. Also, a small radius R can be machined on the end of the fulcrum 22b which is advantageous because as the lever spring 22c bends around the fulcrum 22b, a diameter of a pivot point changes less with a small radius than with a large radius. Therefore, the lever ratio is more consistent and the clamp force is more consistent. The lever spring 22a reacts against the outer support housing 40/drive ring 28a to provide preload for an actuator bearing 42. The preload for the actuator bearing 42 is subject to outer housing 40 and lever spring 22a tolerances. In this embodiment, there is no correction for preload.

Figure 2:
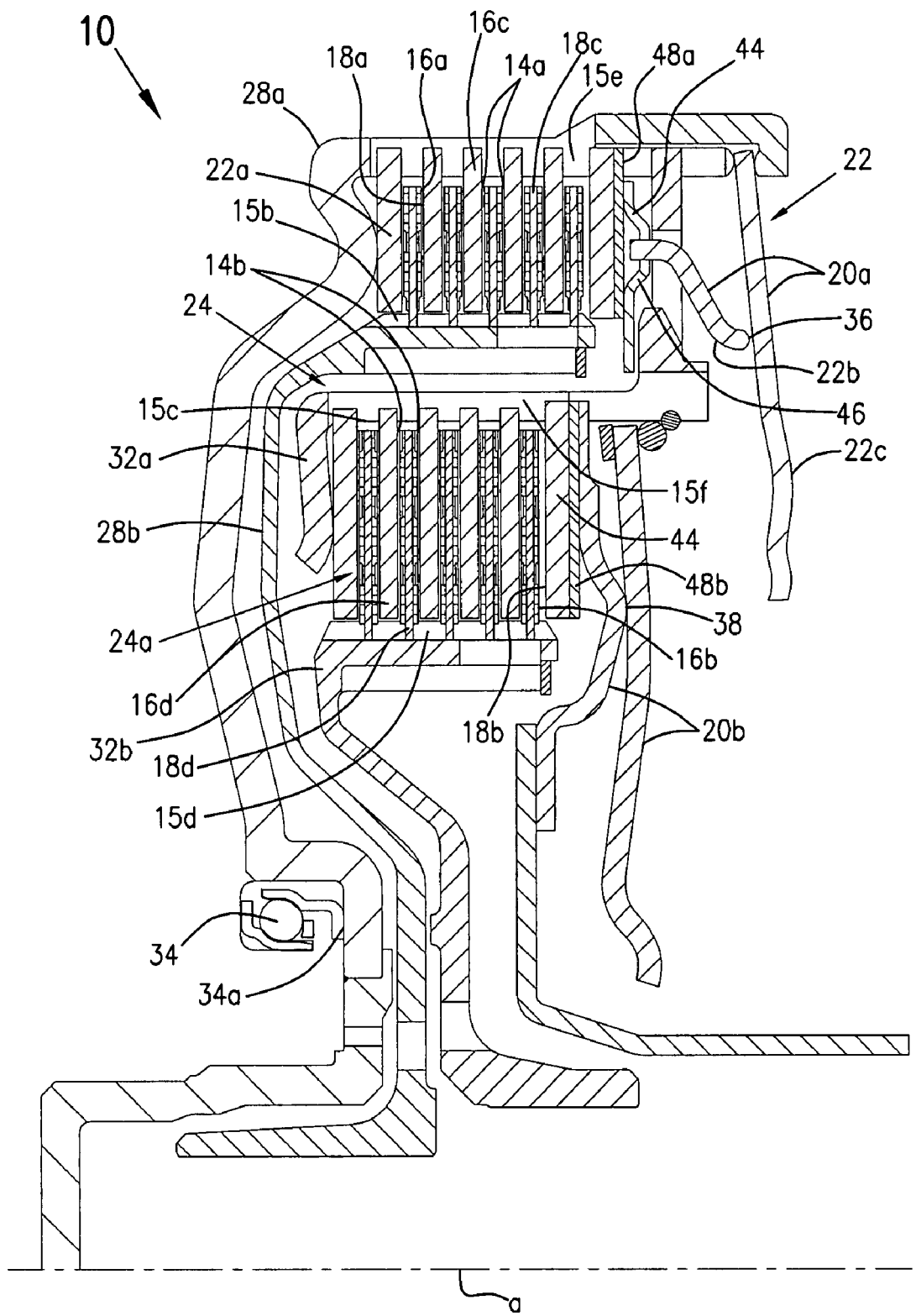
FIG. 2 is an upper half cross sectional side view of a second preferred embodiment of a dual output clutch in accordance with the invention.

In the embodiment shown in FIG. 2, the outer clutch portion 22 has a fulcrum 22b that reacts against lever spring 22c and transmits axially applied force to a pusher 44 that distributes the load applied to outer clutch pack 22a. Pusher 44 preferably incorporates an integrated oil dam 46 that blocks cooling oil flow from by passing clutch pack 22a. This improves heat transfer from the clutch to the oil. Tolerance from the main clutch bearing 34 to touch points 36 and 38 are adjusted using shims 48a and 48b that are selected according to thickness and placed between the fulcrum and the pusher 44 to adjust distance from main clutch bearing surface 34a to the touch point 36.

Figure 3:
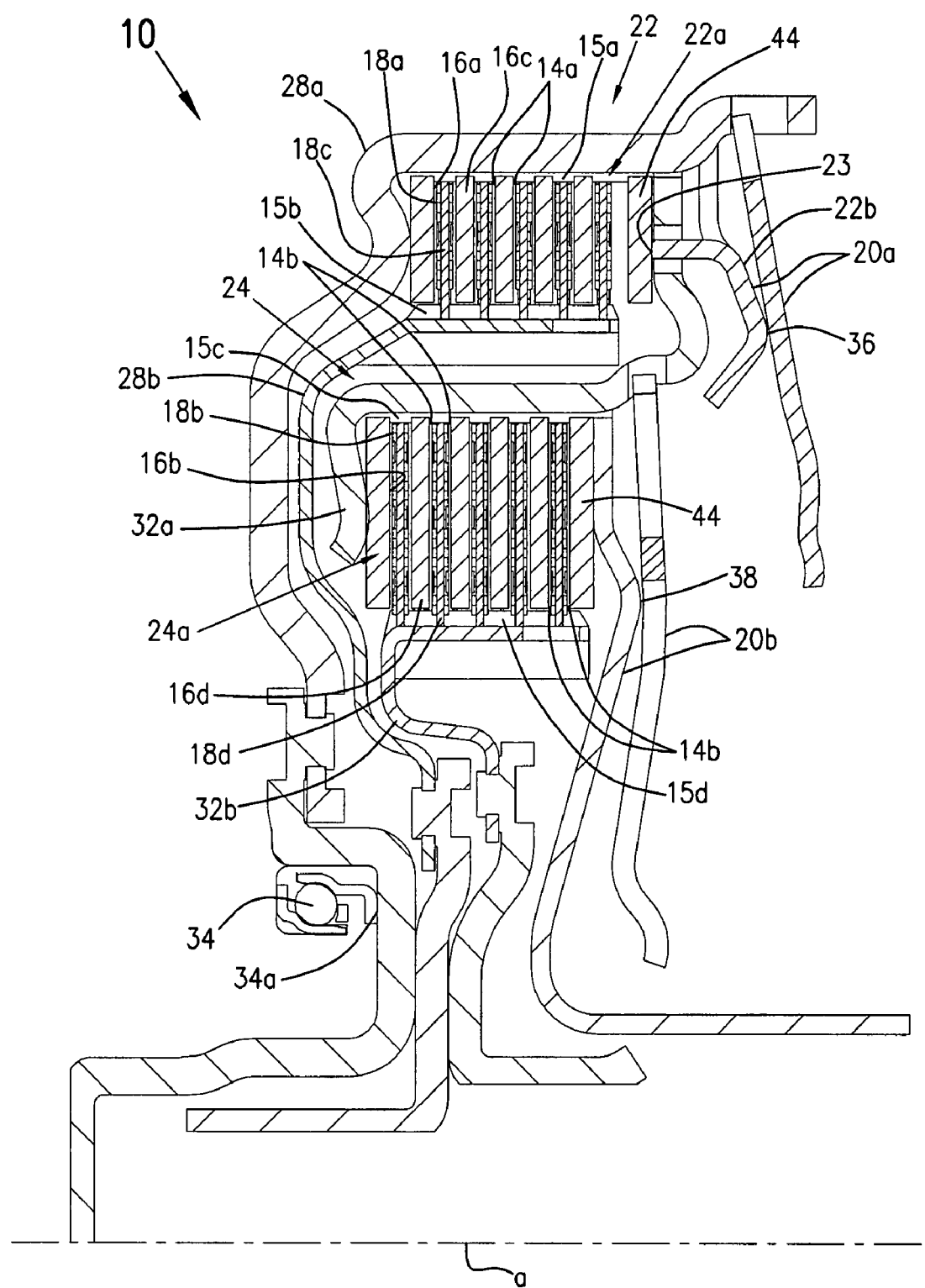
FIG. 3 is an upper half cross sectional side view of a third preferred embodiment of a dual output clutch in accordance with the invention.

In the embodiment shown in FIG. 3, tolerance from the main clutch bearing surface 34a to the outer touch point 36 is adjusted by measuring the distance from the bearing surface on the clutch hub 34a to the touch point 36 in a direction parallel to the rotational axis "a" of the drive ring, and machining a push end 23 of the fulcrum 22b to produce the desired distance from the bearing surface 34a to the touch point 36. The fulcrum 22b is preferably bent down at an inner diameter to improve stiffness of the fulcrum 22a.

Figure 4:
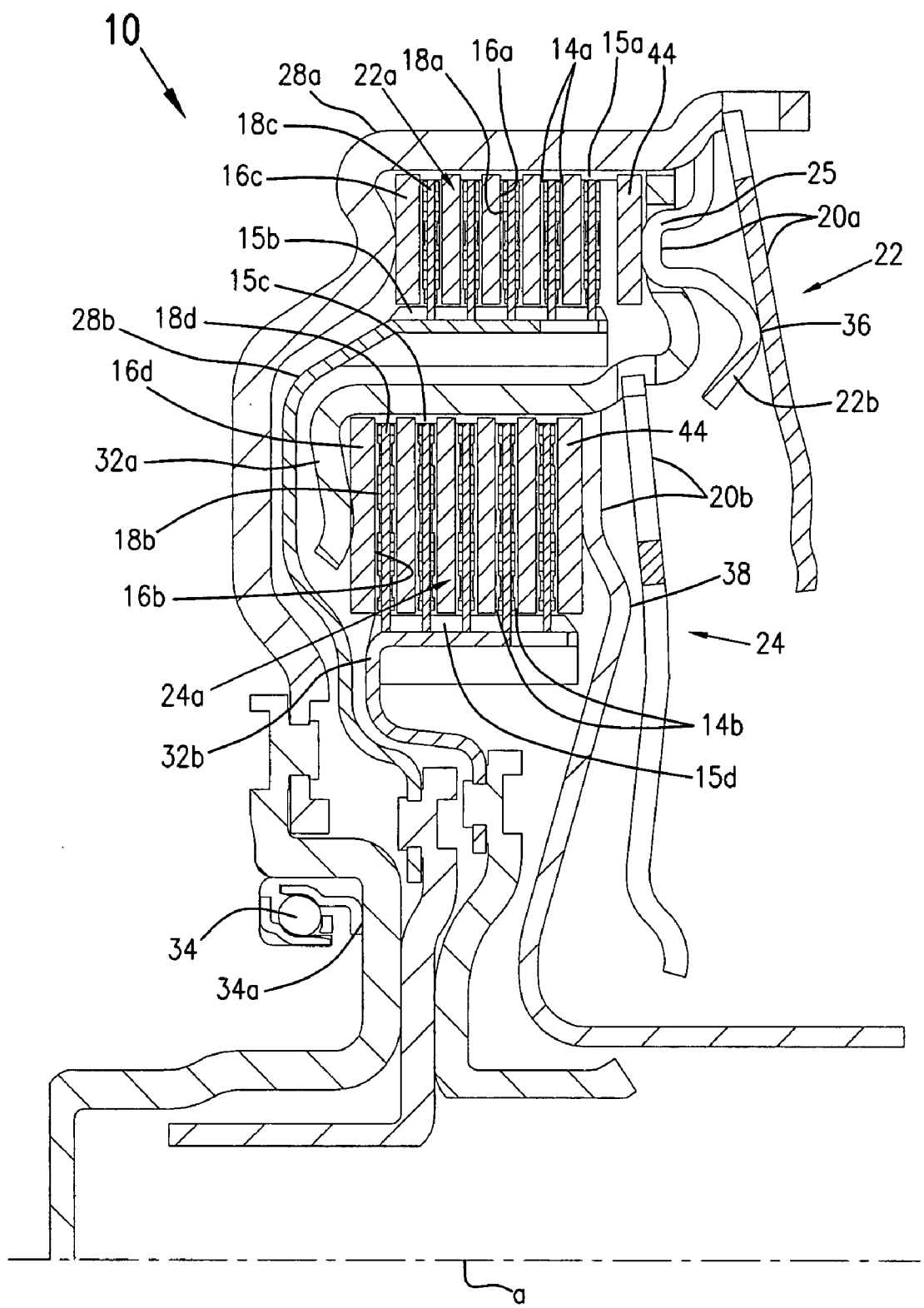
FIG. 4 is an upper half cross sectional side view of a fourth preferred embodiment of a dual output clutch in accordance with the invention.

The embodiment shown in FIG. 4 is similar to that of FIG. 3 but the fulcrum 22b is bent inwardly to provide a centrally protruding larger surface area portion 25 to distribute applied force over a larger area of pusher 44. Tolerance is adjusted by machining or shimming at area 25.

Figure 5:
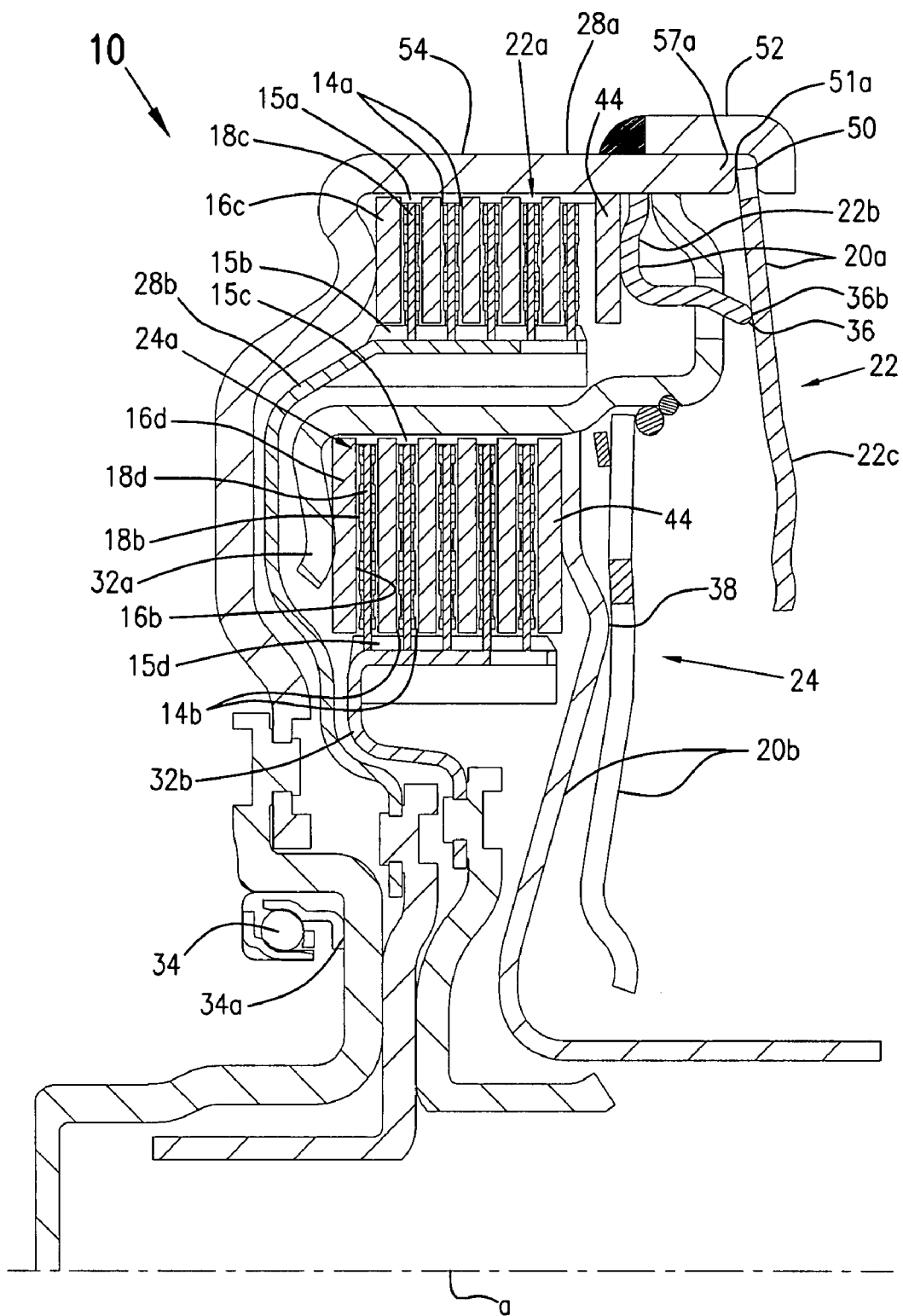
FIG. 5 is an upper half cross sectional side view of a fifth preferred embodiment of a dual output clutch in accordance with the invention.

FIG. 5 shows an embodiment similar to FIG. 3. The outer clutch 22 has a fulcrum 22b that reacts against the lever spring 22c and transmits axially applied force to the outer clutch pack 22a.

Preload of the lever spring 22c can be adjusted by determining the desired distance from a support point 51a at the top 50 of the lever spring 22c at the outer support housing 54/drive ring 28a to the bearing surface 34a to obtain the desired preload and machining the top 50 of the lever spring, or machining or shimming retaining surface 57a of outer support housing 54 at support point 51a to provide the correct preload of the lever spring 22c.

The tolerance from the main clutch bearing surface 34a on the hub to the touch point 36, as previously described, is adjusted by determining the desired distance of the bearing surface 34a to the touch point 36 and machining a pivot end 36b of the fulcrum 22b to a required size to produce the desired distance from the bearing surface 34a to the touch point 36.

Figure 6:
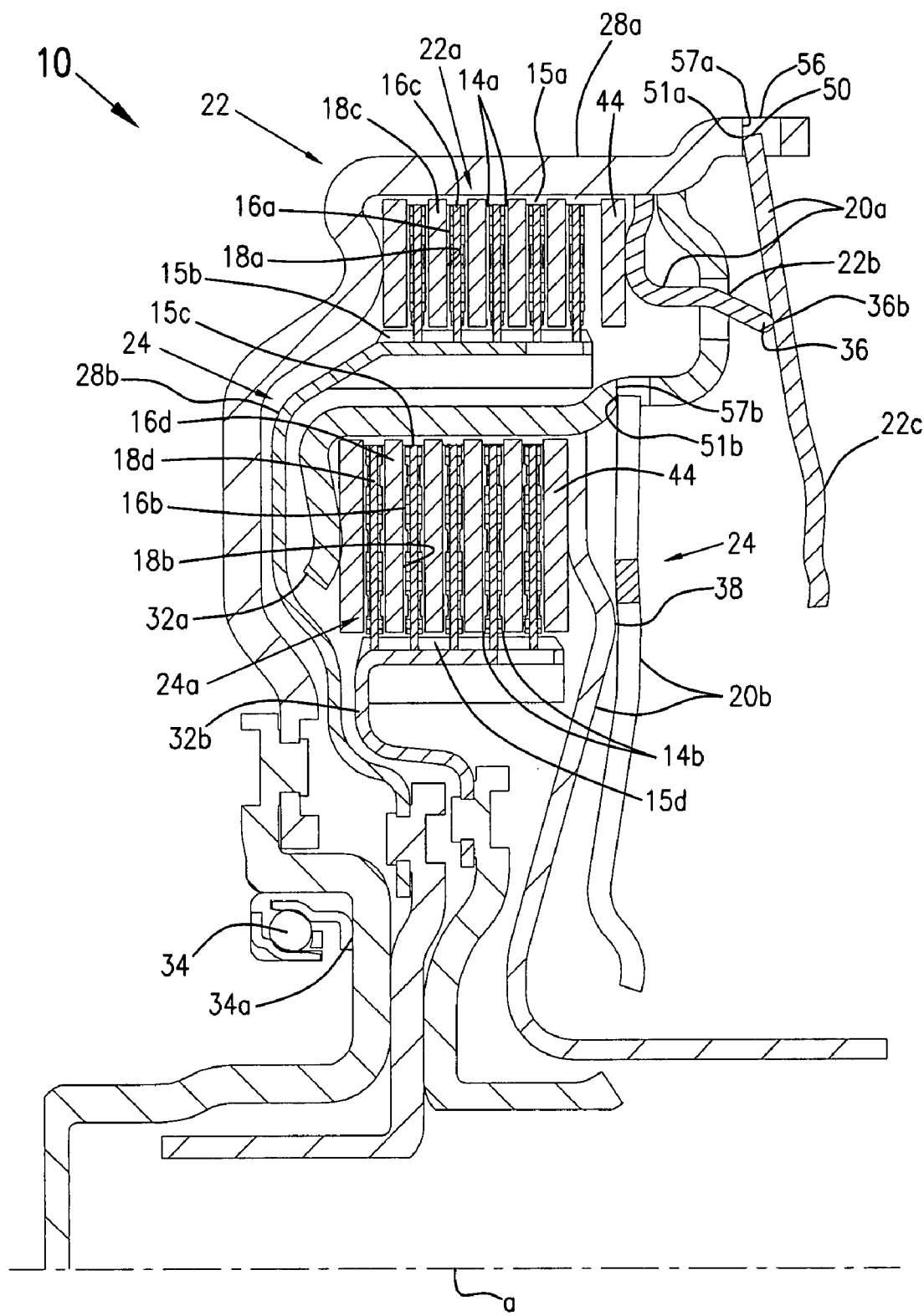
FIG. 6 is an upper half cross sectional side view of a sixth preferred embodiment of a dual output clutch in accordance with the invention.
Figure 7:
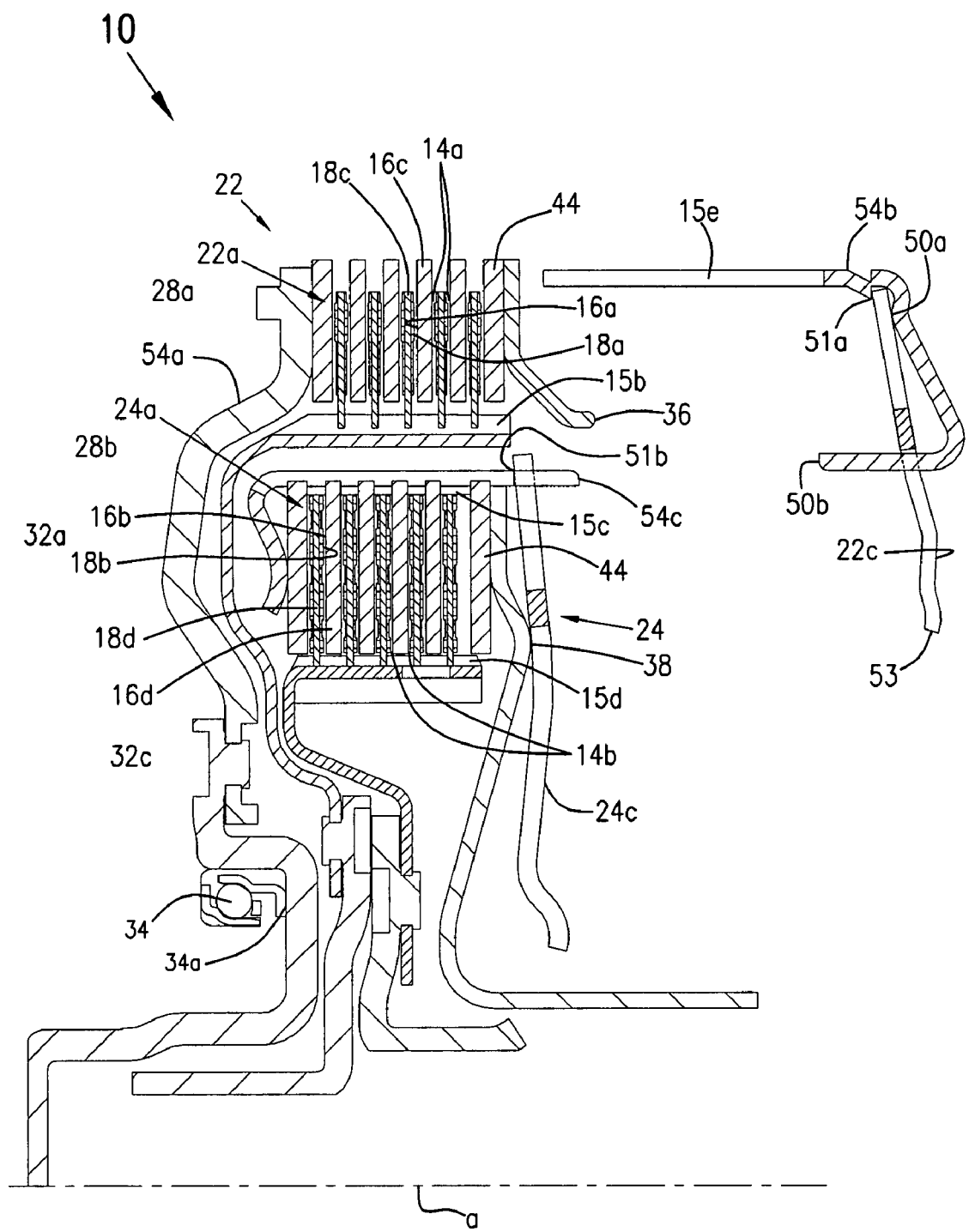
FIG. 7 is an upper half cross sectional disassembled side view of a seventh preferred embodiment of a dual output clutch in accordance with the invention.
Figure 8:
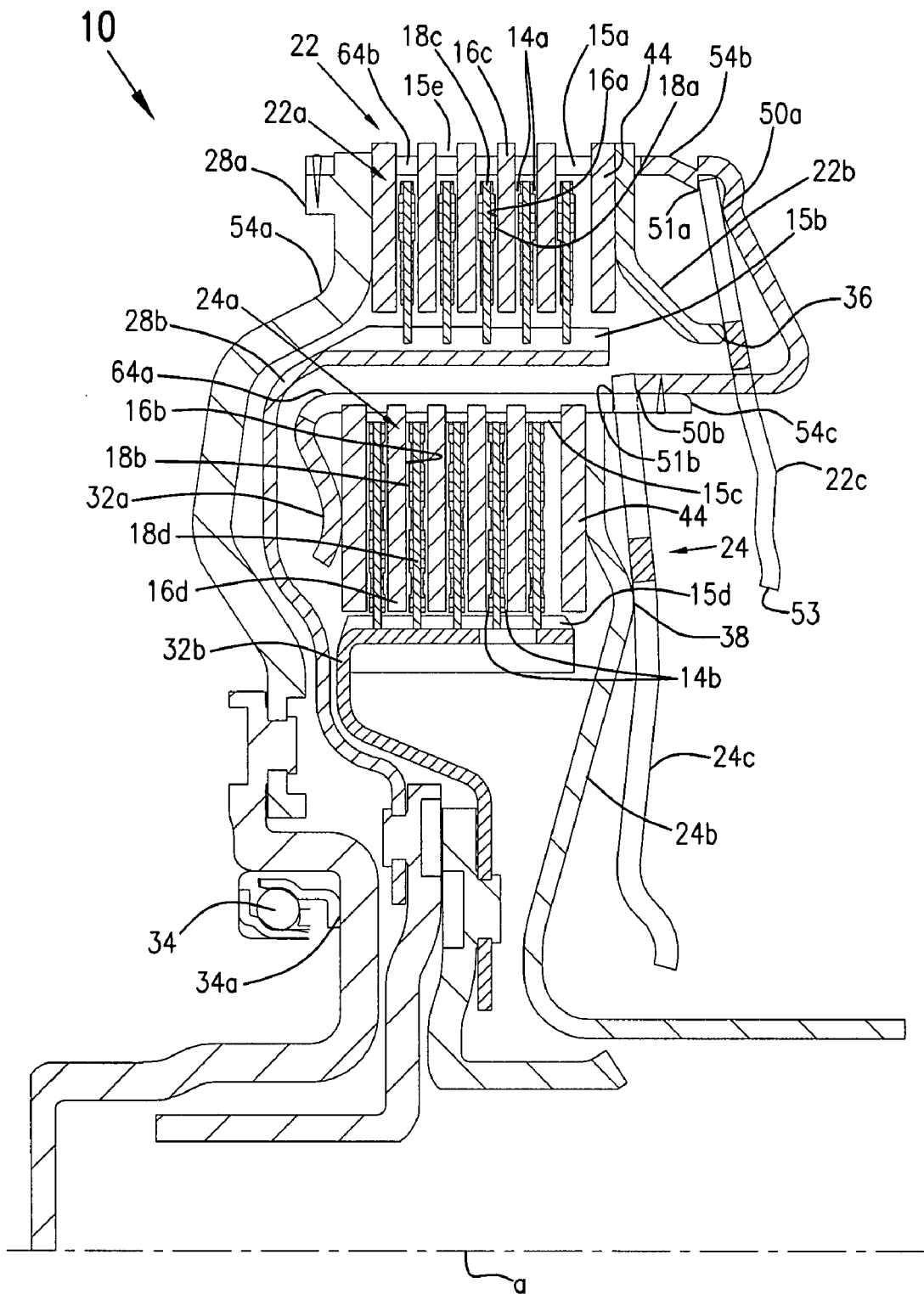
FIG. 8 is an upper half cross sectional side view of the assembled preferred embodiment of FIG. 7.

FIG. 6 shows an embodiment similar to that of FIG. 5 except that top 50 of lever spring 22c is held in a slot 56 in drive ring 28a/outer support housing 54. Spring preload for the outer clutch portion can be adjusted by moving the top 50 of lever spring 22c within the slot 56 toward or away from bearing surface 34a to change support point 51a by machining and/or shimming at retaining surface 57a. Spring preload for the inner clutch portion can be similarly adjusted by machining or shimming a retaining surface 57b to move support point 51b FIGS. 7 and 8 show an embodiment where the outer support housing 54 is divided into two pieces, outer plate 54a (usually drive ring 28a) and outer carrier 54b. Outer carrier 54b is provided with a plurality of fingers 15e arranged in a ring that can be assembled into slots in friction plates 16c. Outer lever spring 22c is assembled to outer carrier 54b.

Tolerance is adjusted by determining the distance of the touch point 36 from bearing surface 34a and connecting the outer carrier 54b to the outer plate 54a at the desired distance to meet tolerance. Spring support point 51a distance from the clutch bearing surface 34a can be adjusted by controlling the position where the outer carrier 54b is connected (welded) to the outer plate 54a. Support point 51a and pivot point 50a are both parts of the outer carrier 54b thus axial location of the outer support point 51a relative to the main clutch bearing surface 34a is controlled by the distance that the outer carrier 54b is slid into the outer plate 54a before welding. By controlling the location of the outer support point 51a, the location of the inner circumference 53 of the spring 22c can be controlled to assure sufficient preload on the release bearing. The axial location of the inner spring 24c is also controlled, dependent upon location of outer spring 22c. Distance from the inner spring pivot point 50b to outer spring pivot point 50a can be controlled by stamping tolerance or machining. The inner spring pivot point 50b is also part of the outer carrier 54b.

The assembly/adjustment process could follow the steps of: assembling the inner clutch pack 24a into the inner carrier 54c, adjusting the inner clutch portion touch point 38 by machining or shims, assembling the inner clutch portion spring 24c, machining the outer carrier 54b to control distance from the inner spring pivot point 50b to the outer spring pivot point 50a if necessary, assembling the outer clutch spring 22c into the outer carrier 54b, sliding the outer carrier 54b into the inner carrier 54c until it touches the inner spring 24c, adjusting the outer clutch portion touch point 36 relative to the clutch bearing surface 34a using machining or shims, and welding the outer carrier 54b to the outer plate 54a while controlling spring support point 51a distance from the clutch bearing surface 34a.

Figure 9:
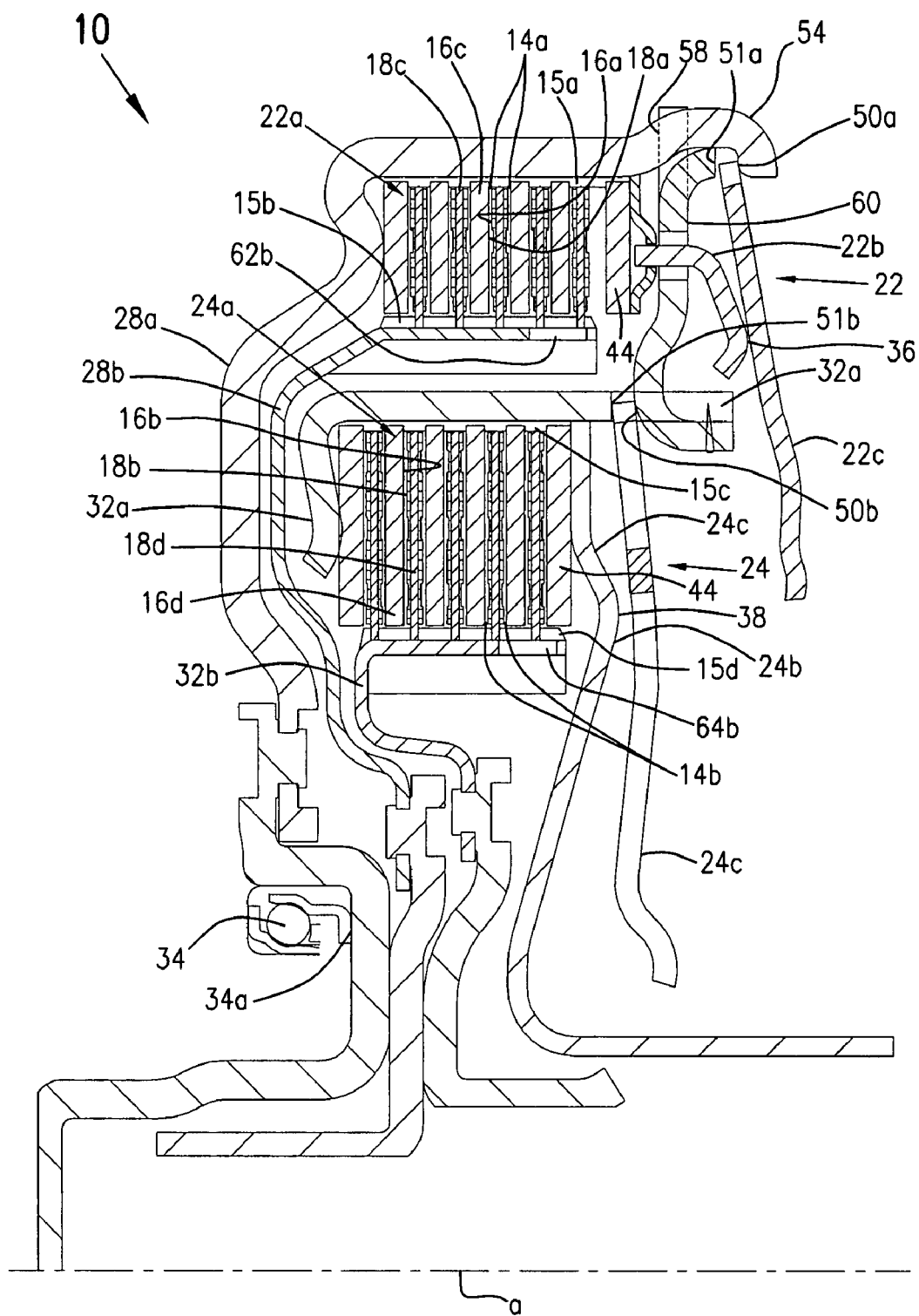
FIG. 9 is an upper half cross sectional side view of an eighth preferred embodiment of a dual output clutch in accordance with the invention.

FIG. 9 also shows an embodiment where spring preloads can be controlled. Preload of outer spring 22c may be adjusted by machining a support surface 51a of a support flange 60 to control outer spring support point 51a relative to the main clutch bearing surface 34a. The outer support housing 54 may also be machined to control the location of the pivot point 50a. Both the support point 51a and the pivot point 50a are adjusted relative to the main clutch bearing surface 34a.

The assembly/adjustment process could follow the steps of: machining outer support housing pivot point 50a relative to the main clutch bearing support 34a, measuring distance of notch 58 from the main bearing 34a in an axial direction, machining the flange outer support point 51a based upon distance of the notch 58 from bearing surface 34a to correct preload, machining the flange 60 inner pivot point 50b based upon distance of the notch 58 from bearing surface 34a to adjust pivot point 50b, assemble the inner clutch pack 24a and shim to adjust inner touch point 38 relative to the inner support point 51b, assembling the inner spring 24c, connect (e.g. weld) the inner housing 32a to the flange 60, assembling the outer clutch pack 22a and shimming or machining to adjust the outer touch point 36, installing the flange in support housing 54 (drive ring 28a), and installing the fulcrum 22b and outer spring 22c to retain the flange.

By this method, the inner clutch touch point 38 may be adjusted, the distance between the inner spring support point 51b and main bearing surface 34a is adjusted, distance from outer spring touch to bearing surface 34a is adjusted and distance from outer support point 51a to the main bearing surface 34a is adjusted.

It should be understood that the touch point tolerance adjustment for the outer clutch portion 22 in the clutch open position, in all preferred embodiments is the axial distance from the main bearing support 34a to touch point 36 in a position where the friction plates of clutch pack 22a are in contact without excess applied pressure plus the sum of the desired gap distances between friction plates in the outer clutch pack. The tolerance adjustment distance for the inner clutch portion 24 is similarly obtained with respect to the inner touch point 38 and using the gap distances for inner clutch pack 24a.

In the preferred embodiments, liquid in the housing is centrifugally forced through openings 62a, 62b, 64a, and 64b through gaps between pressure plates, when the clutch is partially or completely open. The liquid cools the friction plate surfaces and assists in normalizing gaps between the plates since when the friction plates are not tightly compacted, liquid tends to be centrifugally forced equally between the friction plates. While such openings 62a, 62b, 64a, and 64b are desirably in all preferred embodiments, they are not shown in all views in the drawings due to particular cross sectional positions or removal for ease in seeing other structures.

The following should be viewed in light of FIGS. 1 through 9. In the present invention, clutch packs can be engaged with clutch housings using any means known in the art. In addition, in some aspects, a tab and slot arrangement as described in the commonly assigned United States Provisional Patent Application titled "CLUTCH HOUSING WITH OPENINGS TO ENGAGE A CLUTCH PLATE," inventors Sturgin et al., filed on the same day as the present application, can be used.

Plate or lever springs can be attached to clutch housings using any means known in the art. In addition, in some aspects, a spring tab and housing slot arrangement as described in the commonly assigned United States Provisional Patent Application titled "CLUTCH HOUSING WITH LEVER SPRING RETENTION SLOTS AND METHOD OF INSTALLING A LEVER SPRING," inventors Todd Sturgin and Adam Uhler, filed on the same day as the present application, can be used.

Any means known in the art, for example, complimentary splines and notches or welding, can be used to connect inner and outer clutch housings. In addition, in some aspects, a tab and slot arrangement as described in the commonly assigned United States Provisional Patent Application titled "CLUTCH HOUSING WITH WIDE LEVER SPRING RETENTION SLOTS AND CLUTCH HOUSING WITH AXIALLY OFF-SET TABS," inventor Adam Uhler, filed on the same day as the present application, can be used.

What is claimed is:

1. A clutch, for at least partial operation within a fluid tight housing containing fluid, said clutch comprising first and second independently actuatable first and second clutch portions wherein the first and second clutch portions have radially concentric first and second clutch packs respectively for operation within the fluid tight housing, one of said first and second clutch packs being an outer clutch pack having a larger inside diameter than an outside diameter of the other of said first and second clutch packs, said other clutch pack being an inner clutch pack, a) said first clutch portion including:
      a first clutch portion clutch pack including:
      i) a first clutch pack first series of coaxial friction plates engaged with a first drive ring and being axially movable in relation thereto, said first drive ring acting as at least a portion of a support housing for the clutch, said first drive ring being directly or indirectly connectable to the drive shaft of an engine; and
      ii) a first clutch pack second series of coaxial friction plates engaged with a first driven ring and being axially movable in relation thereto, said driven ring being directly or indirectly connectable to a first input shaft to a transmission,
      the friction plates of the second series of friction plates being in alternating relationship and coaxial with the friction plates of the first series of friction plates to form a friction plate set, the friction plates of the first series being normally in a spaced relationship with the friction plates of the second series such that there is an average gap of from about 0.05 to about 0.25 mm between adjacent friction plates,
      said friction plates being movable toward each other along their respective drive and driven rings so as to engage each other on friction surfaces of the friction plates so as to enable the transfer of torque from the drive ring to the driven ring without significant slippage between adjacent friction plates,
   b) said second clutch pack comprising:
      i) a second clutch pack first series of coaxial friction plates engaged with a second drive ring and being axially movable in relation thereto, said second drive ring being directly or indirectly connectable to the drive shaft of an engine; and
      ii) a second clutch pack second series of coaxial friction plates engaged with a second driven ring and being axially movable in relation thereto, said second driven ring being directly or indirectly connectable to a second input shaft to the transmission,
      the friction plates of the second clutch pack second series of friction plates being in alternating relationship and coaxial with the friction plates of the second clutch pack first series of friction plates to form a friction plate set, the friction plates of the second clutch pack first series being normally in a spaced relationship with the friction plates of the second clutch pack second series such that there is an average gap of from about 0.05 to about 0.25 mm between adjacent friction plates,
      said friction plates of said second clutch pack being movable toward each other along their respective drive and driven rings so as to engage each other on their surfaces so as to enable the transfer of torque from the second drive ring to the second driven ring without significant slippage between adjacent friction plates wherein a second apparatus is provided to move said friction plates of the second clutch pack toward each other, wherein the first mechanical apparatus and second apparatus can operate independently of each other so as to engage and disengage the friction plates of the first and second clutch packs independently of each other; and
   c) mechanical apparatus provided to move said friction plates toward each other wherein the first clutch portion is an outer clutch portion having an outer fulcrum that reacts against an outer lever spring and the outer fulcrum directly or indirectly transmits applied force to the outer clutch pack to engage the outer clutch pack friction surfaces, as a result of pressure applied to the fulcrum by the outer lever spring and the clutch is provided with a main clutch bearing permitting clutch rotation and tolerance from the main clutch bearing to a touch point between the outer fulcrum and the outer lever spring is adjusted to permit an average normally open spacing between friction surfaces of between about 0.05 and about 0.25 mm and to permit sufficient pressure on the friction surfaces during engagement to prevent significant slippage during torque transfer.

2. The clutch of claim 1 wherein the second clutch portion is an inner clutch portion having an inner fulcrum that reacts against an inner lever spring and the inner fulcrum directly or indirectly transmits applied force to the inner clutch pack to engage the inner clutch pack friction surfaces, as a result of pressure applied to the inner fulcrum by the inner lever spring and the clutch is provided with a main clutch bearing permitting clutch rotation and tolerance from the main clutch bearing to an inner touch point between the inner fulcrum and the inner lever spring is adjusted to permit an average normally open spacing between inner friction surfaces of between about 0.05 and about 0.25 mm and to permit sufficient pressure on the friction surfaces during engagement to prevent significant slippage during torque transfer.

3. The clutch of claim 2 wherein tolerance from the main clutch bearing to the inner touch point between the inner fulcrum and the inner lever spring is adjusted by machining or shimming a push portion of the inner fulcrum or by machining the pivot portion of the inner fulcrum.

4. The clutch of claim 2 wherein the outer drive ring and inner drive ring are interconnected by a support flange having a support point for the outer spring and preload of the outer spring is adjusted by machining the flange at the support point to control the outer spring support position relative to the main clutch bearing.

5. The clutch of claim 4 where a pivot point for the outer spring is located on an outer support housing comprising the outer drive ring and the outer support housing is machined to control the location of the pivot point relative to the main clutch bearing.

6. The clutch of claim 1 wherein an adjustment is accomplished by machining a pivot force receiving end of the fulcrum to produce a desired distance from the bearing to the touch point.

7. The clutch of claim 6 wherein a radius approximating half the thickness of the fulcrum is machined at an end of the fulcrum at the touch point to maintain a more consistent lever ratio.

8. The clutch of claim 1 wherein an outer pusher is provided between the outer fulcrum and the outer clutch pack such that the outer fulcrum reacts against the outer lever spring and transmits applied force through the outer pusher to the outer clutch pack to engage the outer clutch pack friction surfaces and tolerance between the main clutch bearing and the outer touch point is adjusted using shims between the clutch plates and the outer pusher.

9. The clutch of claim 8 wherein the outer pusher incorporates an oil dam that prevents cooling oil flow from bypassing the outer clutch pack.

10. The clutch of claim 1 wherein tolerance from the main clutch bearing to the outer touch point between the outer fulcrum and the outer lever spring is adjusted by machining or shimming a push portion of the outer fulcrum.

11. The clutch of claim 1 wherein the outer fulcrum is bent at an inner diameter to increase fulcrum stiffness and to form a surface containing the touch point.

12. The clutch of claim 1 wherein the outer fulcrum is bent to form a surface at a push portion to distribute force over a larger surface area of the outer clutch pack.

13. The clutch of claim 1 wherein an outer lever spring preload is adjusted by machining the support housing at an outer support point for the outer lever spring to adjust support point distance from the clutch main bearing.

14. The clutch of claim 1 where an outer lever spring preload is adjusted by shims between the support housing of the clutch and an outer support point for the outer lever spring.

15. The clutch of claim 1 wherein the clutch support housing for use within a fluid tight housing, comprises an outer plate and an outer carrier and the outer lever spring is assembled to the outer carrier and outer lever spring support point distance from the clutch main bearing is adjusted by connecting the outer carrier to the outer plate to obtain a desired outer lever spring preload.

16. A method for adjusting a clutch for use within a fluid tight housing wherein the clutch comprises first and second independently actuatable clutch portions each having radially concentric first and second clutch packs respectively, one of said first and second clutch packs being an outer clutch pack having a larger inside diameter than an outside diameter of the other of said first and second clutch packs, said other clutch pack being an inner clutch pack,
   a) said first clutch portion clutch pack including:
      i) a first clutch pack first series of coaxial friction plates engaged with a first drive ring and being axially movable in relation thereto, said first drive ring forming at least a portion of an outer support housing for the clutch, and being directly or indirectly connectable to the drive shaft of an engine; and
      ii) a first clutch pack second series of coaxial friction plates engaged with a first driven ring and being axially movable in relation thereto, said driven ring being directly or indirectly connectable to a first input shaft to a transmission,
   the friction plates of the first clutch pack second series of friction plates being in alternating relationship and coaxial with the friction plates of the first clutch pack first series of friction plates to form a friction plate set, the friction plates of the first series being normally in a spaced relationship with the friction plates of the second series such that there is an average gap of from about 0.05 to about 0.25 mm between adjacent friction plates,
   said friction plates being movable toward each other along their respective drive and driven rings so as to engage each other on friction surfaces of the friction plates of the first clutch pack so as to enable the transfer of torque from the drive ring to the driven ring without significant slippage between adjacent friction plates; and
   first mechanical apparatus provided to move said friction plates toward each other; and
   said second clutch pack comprising:
      i) a second clutch pack first series of coaxial friction plates engaged with a second drive ring and being axially movable in relation thereto, said second drive ring being directly or indirectly connectable to the drive shaft of an engine; and
      ii) a second clutch pack second series of coaxial friction plates engaged with a second driven ring and being axially movable in relation thereto, said second driven ring being directly or indirectly connectable to a second input shaft to a transmission,
   the friction plates of the second clutch pack second series of friction plates being in alternating relationship and coaxial with the friction plates of the second clutch pack first series of friction plates to form a friction plate set, the friction plates of the second clutch pack first series being normally in a spaced relationship with the friction plates of the second clutch pack second series such that there is an average gap of from about 0.05 to about 0.25 mm between adjacent friction plates,
   said friction plates of said second clutch pack being movable toward each other along their respective drive and driven rings so as to engage each other on their surfaces so as to enable the transfer of torque from the second drive ring to the second driven ring without significant slippage between adjacent friction plates; and
   second mechanical apparatus provided to move said second clutch pack friction plates toward each other;
   wherein the first clutch portion is an outer clutch portion having an outer fulcrum that reacts against an outer lever spring and the outer fulcrum directly or indirectly transmits applied force to the outer clutch pack to engage the outer clutch pack friction surfaces, as a result of pressure applied to the fulcrum by the outer lever spring;
   wherein the second clutch portion is an inner clutch portion has an inner fulcrum that reacts against an inner lever spring and the inner fulcrum directly or indirectly transmits applied force to the inner clutch pack to engage the inner clutch pack friction surfaces, as a result of pressure applied to the inner fulcrum by the inner lever spring and the clutch is provided with a main clutch bearing permitting clutch rotation; and
   wherein the clutch is provided with a main clutch bearing permitting clutch rotation;
   said method comprising:
   adjusting tolerance from the main clutch bearing to a touch point between the outer fulcrum and the outer lever spring to permit an average normally open spacing between friction surfaces of between about 0.05 and about 0.25 mm and to permit sufficient pressure on the friction surfaces during engagement to prevent significant slippage during torque transfer; and
   adjusting tolerance from the main clutch bearing to an inner touch point between the inner fulcrum and the inner lever spring to permit an average normally open spacing between inner friction surfaces of between about 0.05 and about 0.25 mm and to permit sufficient pressure on the friction surfaces during engagement to prevent significant slippage during torque transfer.

17. The method of claim 16 wherein tolerance from the main clutch bearing to the outer touch point between the outer fulcrum and the outer lever spring is adjusted by machining or shimming a push portion of the outer fulcrum or by machining or shimming at the outer pivot portion of the outer fulcrum.

18. The method of claim 16 wherein tolerance from the main clutch bearing to the inner touch point between the inner fulcrum and the inner lever spring is adjusted by machining or shimming a push portion of the inner fulcrum or by machining the pivot portion of the inner fulcrum.

19. The method of claim 16 wherein an outer lever spring preload is adjusted by machining an outer drive ring of the clutch where an outer support point of the lever spring is located to adjust support point distance from the clutch main bearing.

20. The method of claim 16 where an outer lever spring preload is adjusted by shims between an outer drive ring of the clutch and an outer support point for the outer lever spring.

21. The method of claim 16 wherein the clutch outer support housing comprises an outer plate and an outer carrier and an outer lever support point distance from the clutch main bearing is adjusted by connecting the outer carrier to the outer plate based on an outer lever spring preload.

22. The method of claim 16 wherein an outer lever spring preload is adjusted by machining or shimming an outer drive ring of the clutch at an outer lever spring support point.

23. The method of claim 16 wherein an end of at least one fulcrum of at least one of the clutch portions is machined to obtain a radius approximating half of fulcrum thickness of its fulcrum at an end of the fulcrum at the touch point to maintain a more consistent lever ratio.

24. The method of claim 16 wherein a pusher is provided in at least one of the clutch portions between its fulcrum and its clutch pack such that its fulcrum reacts against its lever spring and transmits applied force through the pusher to the clutch pack to engage the clutch pack friction surfaces and tolerance between the main clutch bearing and the touch point is adjusted using shims between the clutch plates and the pusher where the shims are selected according to thickness to adjust distance from the main clutch bearing to the touch point of the clutch portion.

25. The method of claim 16 wherein tolerance from the main clutch bearing to a touch point for at least one of the clutch portions is adjusted by determining distance from a hub bearing surface of the clutch bearing to the clutch portion touch point on the fulcrum on a line parallel to a rotational axis of the drive ring and then machining a pivot end or push end of the fulcrum to produce the desired distance from the bearing to the touch point.

26. The method of claim 16 wherein a fulcrum of at least one of the clutch portions is bent down at an inner diameter to improve stiffness of the fulcrum.

27. The method of claim 16 wherein a fulcrum of at least one of the clutch portions is bent inwardly to provide a centrally protruding larger surface area portion to distribute applied force over a larger area of a pusher and tolerance is adjusted by machining or shimming at the larger surface area.

28. The method of claim 16 wherein preload, of at least one of the lever springs of the first and second clutch portions, is adjusted by machining the top of the lever spring, drive ring, or a spring holder attached to the outer housing, at a lever spring support point to obtain a desired distance from the support point to the main clutch bearing to provide the correct preload of the outer lever spring.

29. The method of claim 16 wherein preload, of at least one of the lever springs of the first and second clutch portions, is adjusted by measuring the distance from a support point at a top portion of the outer lever spring at the outer support housing to a main bearing surface of the main clutch bearing and inserting a shim between the outer support housing and the lever spring to obtain a correct distance to obtain the desired preload.

30. The method of claim 16 wherein the support housing is divided into an outer plate and outer carrier and the outer lever spring is assembled to the outer carrier and outer clutch portion tolerance is adjusted by determining the distance of the outer touch point from a clutch bearing surface and connecting the outer carrier to the outer plate at the desired distance to meet tolerance.

31. The method of claim 30 wherein outer spring preload is adjusted by adjusting outer spring support point distance from the clutch bearing by controlling position where the outer carrier is connected to the outer plate and the outer support point and an outer pivot point are both located at parts of the outer carrier and location of the outer support point relative to the main clutch bearing is controlled by sliding the outer carrier into the outer carrier to control preload on the spring relative to an interconnected release bearing.

32. The method of claim 31 wherein at least one of inner spring tolerance and inner spring preload are controlled by adjusting distance from an inner spring pivot point to the outer spring pivot point by stamping tolerance or machining.

33. The method of claim 16 wherein the outer drive ring and inner drive ring are interconnected by a support flange having a support point for the outer spring and preload of the outer spring is adjusted by machining the flange at the support point to control the outer spring support position relative to the main clutch bearing.

34. The method of claim 33 where a pivot point for the outer spring is located on an outer support housing comprising the outer drive ring and the outer support housing is machined to control the location of the pivot point relative to the main clutch bearing.

35. The method of claim 33 comprising:
machining the outer support housing outer spring pivot point relative to the main clutch bearing to adjust an outer touch point between the outer spring and outer fulcrum,
machining the support flange outer spring support point relative to the main bearing to adjust outer spring preload,
machining the support flange at an inner spring pivot point to adjust the inner spring pivot point relative to the outer spring pivot point,
assembling the inner clutch pack and inner fulcrum into an inner support housing comprising the inner drive ring while shimming to adjust the inner spring touch point at the inner fulcrum relative to the inner spring support point,
assembling the inner spring,
securing the inner support housing to the flange,
assembling the outer clutch pack while shimming or machining to adjust the outer spring touch point relative to the outer spring support point,
assembling the flange within the outer support housing, and
installing the outer fulcrum and outer spring.

* * * * *